United States Patent [19]

Yee et al.

[11] Patent Number: 5,447,555
[45] Date of Patent: Sep. 5, 1995

[54] OXYGEN PRODUCTION BY STAGED MIXED CONDUCTOR MEMBRANES

[75] Inventors: Terrence F. Yee, Macungie; Rajagopalan S. Srinivasan, Allentown, both of Pa.; Robert M. Thorogood, Cary, N.C.

[73] Assignee: Air Products and Chemicals, Inc., Allentown, Pa.

[21] Appl. No.: 180,936

[22] Filed: Jan. 12, 1994

[51] Int. Cl.[6] .................... B01D 53/22; B01D 71/02
[52] U.S. Cl. .................................... 95/54; 96/9
[58] Field of Search ...................... 95/45, 54; 96/9

[56] References Cited

U.S. PATENT DOCUMENTS

| | | | |
|---|---|---|---|
| 4,264,338 | 4/1981 | Null | 95/54 X |
| 4,545,787 | 10/1985 | Hegarty | 55/16 |
| 4,560,394 | 12/1985 | McDonald et al. | 95/54 |
| 5,035,727 | 7/1991 | Chen | 55/16 |
| 5,108,465 | 4/1992 | Bauer et al. | 95/54 |
| 5,118,395 | 6/1992 | Chen et al. | 204/59 |
| 5,160,618 | 11/1992 | Burggraaf et al. | 210/490 |
| 5,160,713 | 11/1992 | Mazanec et al. | 95/54 X |
| 5,169,415 | 12/1992 | Roettger et al. | 95/54 |
| 5,174,866 | 12/1993 | Chen et al. | 204/59 |
| 5,185,014 | 12/1993 | Prasad | 95/54 |
| 5,240,480 | 8/1993 | Thorogood et al. | 95/54 X |
| 5,281,253 | 1/1994 | Thompson | 95/45 X |
| 5,282,969 | 2/1994 | Xu | 95/45 X |
| 5,314,528 | 5/1994 | Monereau | 96/9 X |

FOREIGN PATENT DOCUMENTS 0362898 4/1990 European Pat. Off. .............. 95/54

OTHER PUBLICATIONS

Clark, D. J. et al. "Separation of Oxygen by Using Zirconia Solid Electrolyte Membranes." *Gas Separation & Purification* 1992 vol. 6, No. 4, pp. 201–205.

Wright, John D. et al. "Advanced Oxygen Separation Membranes." Report No. TDA-GRI-90/0303 for Gas Research Institute Contract No. 5087-260-1543, Sep. 1990.

*Primary Examiner*—Robert Spitzer
*Attorney, Agent, or Firm*—John M. Fernbacher

[57] ABSTRACT

High-purity oxygen is recovered from air by a high-temperature ion transport membrane system comprising two or more stages in which each stage operates at a different feed side to permeate side pressure ratio. Operation of the system in multiple stages at controlled pressure ratios produces oxygen at a lower specific power consumption compared with single-stage operation.

31 Claims, 5 Drawing Sheets

OXYGEN PRODUCTION BY STAGED MIXED CONDUCTOR MEMBRANES

FIELD OF THE INVENTION

The invention pertains to the recovery of oxygen by a high temperature ion transport membrane system, and in particular to the use of multiple membrane zones or stages in such a system.

BACKGROUND OF THE INVENTION

Oxygen is an economically important gas which is widely used in large-scale industrial applications. New uses for oxygen are emerging in advanced high-temperature processes for iron and steel manufacture, coal gasification, integrated gasification combined cycle power generation, and oxygen-enriched combustion. In these large-scale applications, the cost of oxygen produced by conventional cryogenic or noncryogenic technology is a major portion of the overall operating cost, and lower oxygen cost will encourage the commercialization of these emerging technologies. New oxygen separation processes which can be thermally integrated with these advanced high-temperature processes will reduce the energy consumed in oxygen production, which in turn will promote the technical and commercial development of such integrated systems.

Oxygen can be recovered from air at high temperatures by inorganic oxide ceramic materials utilized in the form of selectively permeable nonporous ion transport membranes. An oxygen partial pressure differential or a voltage differential across the membrane causes oxygen ions to migrate through the membrane from the feed side to the permeate side where the ions recombine to form electrons and oxygen gas. An ion transport membrane of the pressure-driven type is defined herein as a mixed conductor membrane, in which the electrons simultaneously migrate through the membrane to preserve internal electrical neutrality. An ion transport membrane of the electrically-driven type is defined herein as a solid electrolyte membrane in which the electrons flow from the permeate side to the feed side of the membrane in an external circuit driven by a voltage differential. A comprehensive review of the characteristics and applications of ion transport membranes is given in report entitled "Advanced Oxygen Separation Membranes" by J. D. Wright and R. J. Copeland, Report No. TDA-GRI-90/0303 prepared for the Gas Research Institute, September 1990.

The operation and heat integration of ion transport membranes with combustors, gas turbines, and power recovery systems are disclosed in U.S. Pat. Nos. 4,545,787, 5,035,727, 5,118,395, and 5,174,866. An article entitled "Separation of Oxygen by Using Zirconia Solid Electrolyte Membranes" by D. J. Clark et al in *Gas Separation and Purification* 1992, Vol. 6, No. 4, pp. 201–205 discloses an integrated coal gasification-gas turbine cogeneration system with recovery of oxygen for use in the gasifier. Nonpermeate from the membrane is combusted with gas from the gasifier and passed to the gas turbine cogeneration system.

Each of the high-temperature, nonporous, ion transport membrane systems summarized above is characterized by the use of a single membrane stage for oxygen recovery, and the use of multiple stages or zones is not disclosed.

The separation of gas mixtures by nonporous polymeric membranes and by porous diffusion membranes is well-known in the art. Membrane separation systems utilizing these principles operate at ambient or near-ambient temperatures, and are characterized by permeate selectivities which are significantly lower than the extremely high oxygen selectivities achieved by ion transport membranes. As a result, permeate streams are gas mixtures enriched i n certain components relative to the feed composition. Staged operation of nonporous polymeric membranes and porous diffusion membranes is disclosed in the art, wherein staged operation increases the purity and/or recovery of the desired product.

The successful development and commercialization of oxygen production by ion transport membranes will require flexible systems which maximize energy utilization and allow operation of system components at optimum conditions. The invention disclosed below and described in the claims which follow advances the art and provides improved methods for the production of oxygen by means of multiple ion transport membranes.

SUMMARY OF THE INVENTION

The invention embraces several embodiments of a process to recover high-purity oxygen from air by a high-temperature ion transport membrane system comprising two or more stages in which each stage operates at a different feed to permeate pressure ratio.

In a first embodiment, an oxygen-containing gas mixture, preferably air, is separated by compressing and heating the oxygen-containing gas mixture and passing the resulting compressed and heated mixture into a first membrane separation zone comprising an oxygen-selective ion transport membrane which separates the zone into a feed side and a permeate side, and withdrawing from the zone a first high-purity oxygen permeate stream and a first oxygen-containing non-permeate stream. The first oxygen-containing non-permeate stream is passed into a second membrane separation zone comprising an oxygen-selective ion transport membrane which separates the zone into a feed side and a permeate side, and withdrawing from the zone a second high-purity oxygen permeate stream and a second oxygen-containing non-permeate stream. Each of the membrane separation zones operates at a different ratio of the feed side pressure to the permeate side pressure. Preferably, the ion transport membranes are mixed conductor membranes.

In an alternative embodiment, the oxygen-containing gas mixture is compressed and heated in the same manner as the previous embodiment. A portion of the resulting compressed and heated mixture is passed into a first membrane separation zone comprising an oxygen-selective ion transport membrane which separates the zone into a feed side and a permeate side, and a first high-purity oxygen permeate stream and a first oxygen-containing non-permeate stream are withdrawn from this first zone. Another portion of the resulting compressed and heated mixture is passed into a second membrane separation zone comprising an oxygen-selective ion transport membrane which separates the zone into a feed side and a permeate side, and withdrawing from the zone a second high-purity oxygen permeate stream and a second oxygen-containing non-permeate stream. Each of the membrane separation zones operates at a different ratio of the feed side pressure to the permeate side pressure. Preferably, the ion transport membranes are mixed conductor membranes.

In a third embodiment of the invention, the oxygen-containing gas mixture is compressed to obtain a first compressed gas stream at a first pressure and a second compressed gas stream at a second pressure, and the two streams are heated. The first compressed and heated gas stream at the first pressure is passed into a first membrane separation zone comprising an oxygen-selective ion transport membrane which separates the zone into a feed side and a permeate side, and withdrawing from the zone a first high-purity oxygen permeate stream and a first oxygen-containing non-permeate stream. The second compressed and heated gas stream at the second pressure is passed into a second membrane separation zone comprising an oxygen-selective ion transport membrane which separates the zone into a feed side and a permeate side, and withdrawing from the zone a second high-purity oxygen permeate stream and a second oxygen-containing non-permeate stream. Each of the membrane separation zones operates at a different ratio of the feed side pressure to the permeate side pressure. Preferably, the ion transport membranes are mixed conductor membranes.

Heating of the oxygen-containing streams in the latter two embodiments is accomplished by indirect heat transfer with one or both of the oxygen permeate streams and the oxygen-containing non-permeate stream(s). Additional heating is accomplished by passing the initially-heated stream(s) through a direct or indirect combustor.

Operation of the system in multiple stages in series at controlled feed to permeate pressure ratios produces oxygen at a lower specific power consumption compared with single-stage operation. The operation of the stages in a parallel mode is particularly suited for the production of multiple oxygen streams at different pressures.

DETAILED DESCRIPTION OF THE INVENTION

The present invention is an improved high-temperature process for recovering high purity oxygen from an oxygen-containing gas mixture, preferably air, by means of a multiple-stage ion transport membrane system. The stages may be arranged in either series or parallel configuration. A key feature of the invention is that each of the stages is operated such that the ratio of the feed side pressure to the permeate side pressure is different. In systems with multiple series stages, these ratios are controlled preferably such that the ratio is higher in each succeeding stage. This results in a reduction of the specific power consumption compared with a single-stage system. Preferably, the ion transport membranes are pressure-driven mixed conductor membranes, although electrically-driven solid electrolyte membranes optionally may be utilized if desired.

The definition of the term "stage" has various meanings in the field of gas separation in general and the membrane art in particular. The term has been used in the art to designate series membrane modules as well as parallel membrane modules, including operating modes such as recycle, countercurrent operation, and the like. In the present specification, the term "stage" defines an individual ion transport membrane module which is divided by the membrane into a feed side and a permeate side. A system may comprise two or more stages arranged in series or parallel, and each stage is characterized by a different ratio of the feed pressure to the permeate pressure. Each stage exhibits an extremely high and theoretically infinite oxygen selectivity, which is characteristic of an ion transport membrane because oxygen is the sole diffusing gas. All stages, whether in series or parallel configuration, therefore produce high-purity oxygen permeate streams which are essentially equivalent in oxygen purity. This is a key feature which distinguishes the present invention from previously disclosed multi-stage membrane systems. Such previously disclosed systems utilize solid polymeric membranes, porous diffusion membranes, or other types of membranes, all of which have modest selectivities compared with ion transport membranes. Such multi-stage membrane systems in series configuration are characterized by the fact that each stage produces a mixed permeate at a different composition.

Figure 1:
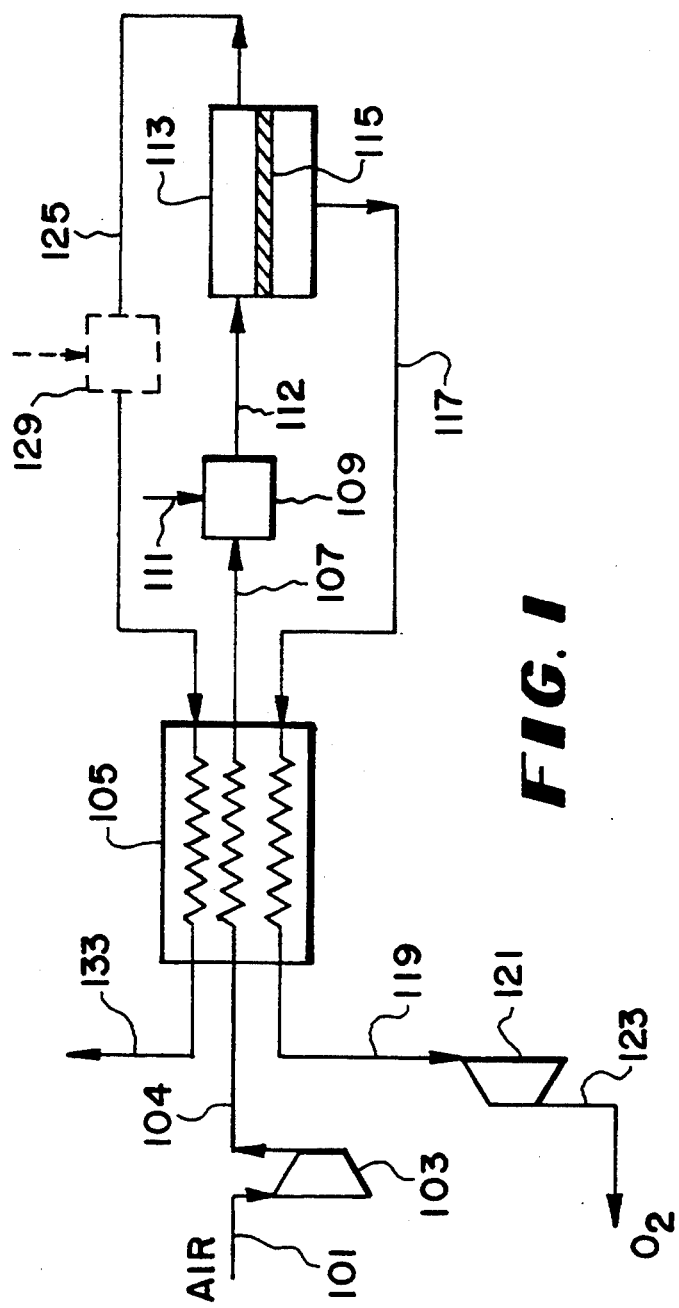
FIG. 1 is a schematic flowsheet of a single-stage ion transport membrane system for recovering high-purity oxygen.

FIG. 1 illustrates a single-stage ion transport membrane system in which air or other oxygen-containing gas 101 is compressed to 15–500 psia in compressor 103 and heated in exchanger 105 by indirect heat exchange with hot gas streams defined later. Heated and compressed stream 107 is optionally further heated in combustor 109 and passed into the feed side of ion transport membrane zone 113 which is divided into a feed side and a permeate side by membrane 115. Combustor 109 can be a direct combustor in which fuel 111 is combusted with oxygen-containing stream 107 to form combustion products which flow as stream 112 directly to membrane zone 113. Alternatively, combustor 109 can be an indirect system, i.e. a process furnace, in which stream 107 is indirectly heated by combustion of fuel 111 with outside air (not shown), whereby the heated stream 112 passes without composition change to membrane zone 113. Stream 112 is typically heated to 500°–1200° C. prior to membrane zone 113. High purity oxygen permeate 117 at greater than 98 vol % $O_2$ is withdrawn and optionally cooled in exchanger 105 against compressed feed 104. Cooled product 119 is compressed as necessary in compressor 121 to yield oxygen product 123. Alternatively, compressor 121 can be replaced by a vacuum blower to withdraw permeate 117 at a subatmospheric pressure thus maximizing the oxygen partial pressure driving force across membrane 115. Nonpermeate stream 125 is optionally heated by direct or indirect combustor 129 and cooled against compressed feed 104 in exchanger 105 to yield cooled nonpermeate stream 133.

Figure 2:
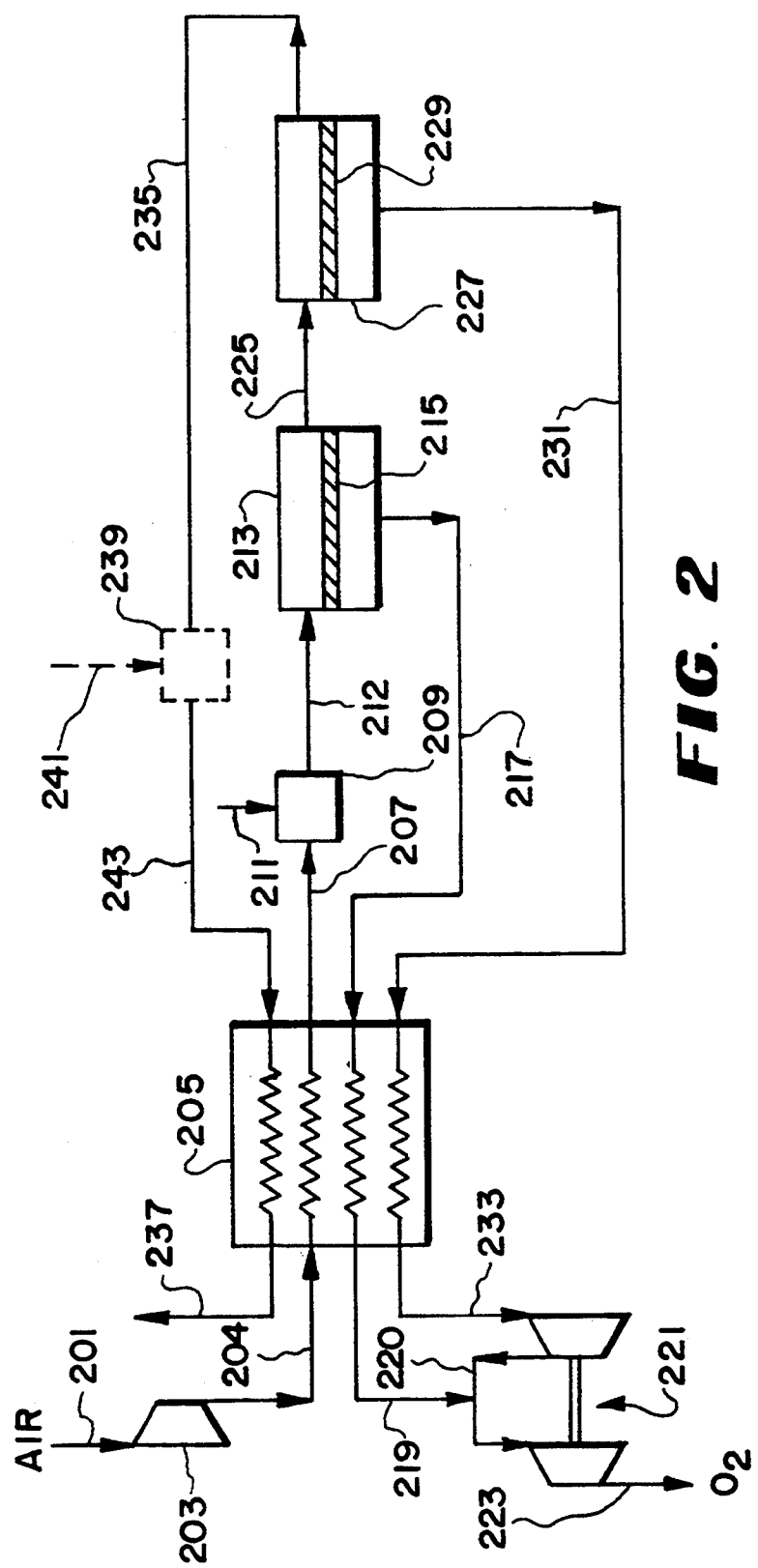
FIG. 2 is a schematic flowsheet of a two-stage series ion transport membrane system for recovering high-purity oxygen according to the present invention.

The present invention is illustrated in one embodiment as shown in FIG. 2. Air or other oxygen-containing gas 201 is compressed to 15–500 psia in compressor 203 and heated in exchanger 205 by indirect heat exchange with hot gas streams defined later. Heated and compressed stream 207 is optionally further heated in combustor 209 and passed into the feed side of ion transport membrane zone 213 which is divided into a feed side and a permeate side by ion transport membrane 215. Combustor 209 can be a direct combustor in which fuel 211 is combusted with oxygen-containing stream 207 to form combustion products which flow as stream 212 directly to membrane zone 213. Alternatively, combustor 209 can be an indirect system, i.e. a process furnace, in which stream 207 is indirectly heated by combustion of fuel 211 with outside air (not shown), whereby the heated stream 212 passes without composition change to membrane zone 213. Stream 12 is typically heated to 500°–1200° C. prior to membrane zone 213. High purity oxygen permeate 217 at greater than 98 vol % $O_2$ is withdrawn and cooled in exchanger 205 against compressed feed 204. Cooled product 219 is compressed with additional oxygen product 220 to the required product pressure in the second stage of two-stage compressor 221 to yield oxygen product 223.

Nonpermeate stream 225 flows through the feed side of membrane zone 227 which is divided into a feed side and a permeate side by ion transport membrane 229. High purity oxygen permeate 231 at greater than 98 vol % $O_2$ is withdrawn and cooled in exchanger 205 against compressed feed 204. Cooled product 233 is compressed in the first stage of compressor 221 to yield intermediate pressure product 220, which is combined with product 219 and compressed to yield oxygen product 223. Nonpermeate stream 235 is cooled against compressed feed 204 in exchanger 205 to yield oxygen-depleted waste stream 237. Optionally, nonpermeate stream 235 can be heated in combustor 239 prior to exchanger 205. Combustor 239 can be a direct combustor in which fuel 241 is combusted with oxygen-containing stream nonpermeate stream 235 to form combustion products which flow as stream 243 directly to exchanger 205. Alternatively, combustor 239 can be an indirect system, i.e. a process furnace, in which stream 235 is indirectly heated by combustion of fuel 241 with outside air (not shown), whereby the heated stream 243 passes without composition change to exchanger 205.

Ion transport membranes 215 and 229 are preferably solid mixed conductor ceramic membranes which selectively permeate oxygen in the form of oxygen ions driven by a negative oxygen partial pressure gradient in the direction of permeation. Preferred membrane materials of the mixed conductor type are described in U.S. Pat. No. 5,240,480, which is incorporated herein by reference. This patent discloses a membrane which comprises a porous layer with an average pore radius of less than 10 microns upon which is deposited a nonporous dense layer, in which both the porous substrate and the nonporous dense layer comprise multicomponent metallic oxides capable of conducting electrons and oxygen ions. This composite membrane operates at temperatures above 500° C. and recovers high purity oxygen i n the pressure-driven mode. Representative membranes are described in which the porous layer and/or the dense layer are formed from a multicomponent metallic oxide selected from the group consisting of $La_{0.2}Ba_{0.8}Co_{0.8}Fe_{0.2}O_{3-x}$, $Pr_{0.2}Ba_{0.8}Co_{0.8}Fe_{0.2}O_{3-x}$, and $La_{0.2}Ba_{0.8}Co_{0.6}Cu_{0.2}O_{3-x}$ where x is between 0 and 1.

A key feature of the invention is that membrane zones 213 and 227 operate at different ratios of the feed pressure to the permeate pressure. The feed side pressures are essentially equivalent, which means that the pressures differ only by the minimal pressure drop through the feed sides of the two zones and related piping. The permeate side pressures are different, however, and are set by the suction pressures in the two stages of compressor 221. The pressure ratio of feed to permeate is lower in the first stage than in the second stage. In this staged membrane operation a different oxygen partial pressure ratio is controlled in each stage which enables a better distribution of the oxygen partial pressure driving force through the system, which leads to a thermodynamically more reversible process compared with the single-stage system of FIG. 1. The staged system of FIG. 2 therefore operates with a lower power consumption compared with the single stage system of FIG. 1 for an equivalent final stage permeate pressure, final oxygen product pressure, and oxygen recovery. This is illustrated in more detail in the Examples which follow.

The embodiment of FIG. 2 can be operated with alternative methods of oxygen final product withdrawal. In one alternative, compressor 221 is replaced by a two-stage vacuum blower in order to increase the overall oxygen partial driving force across membranes 215 and 229; final oxygen product 223 is produced at atmospheric pressure and can be compressed further if necessary. In another alternative, two different oxygen product streams are produced at different total pressures. This can be accomplished for example by withdrawing stream 219 at atmospheric pressure and withdrawing stream 231 at subatmospheric pressure by means of a vacuum blower; other configurations are possible as long as different permeate pressures are maintained in membrane zones 213 and 227.

While FIG. 2 illustrates the use of two stages or zones in series, any number of stages can be used. The use of two and three stages is illustrated in the Examples which follow.

Figure 3:
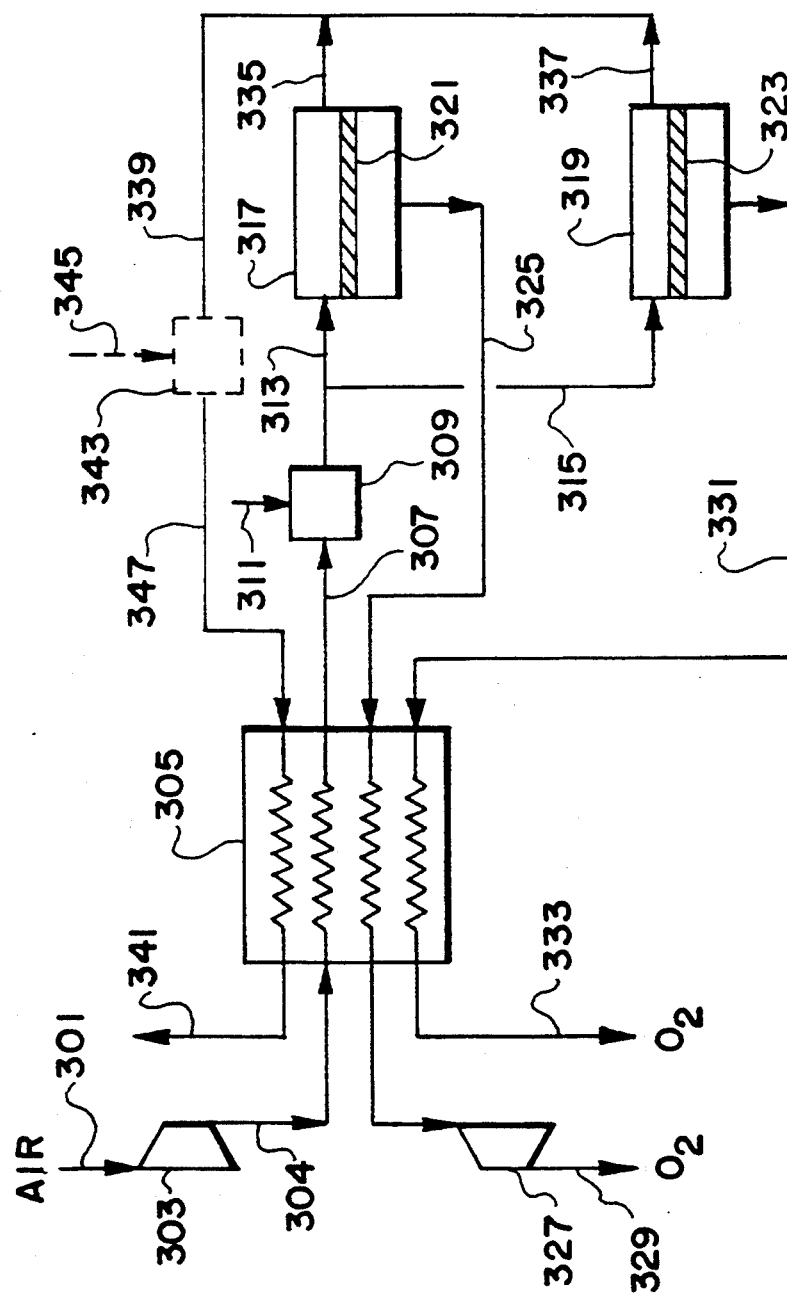
FIG. 3 is a schematic flowsheet of a two-stage parallel ion transport membrane system for recovering high-purity oxygen according to the present invention.

In an alternative embodiment of the invention, the zones or stages are arranged in parallel fashion as illustrated in FIG. 3. In this mode of operation, air or other oxygen-containing gas 301 is compressed to 15–500 psia in compressor 303 and heated in exchanger 305 by indirect heat exchange with hot gas streams defined later. Heated and compressed stream 307 is optionally further heated in combustor 309 and is divided into heated feed streams 313 and 315 which are passed respectively into the feed sides of parallel ion transport membrane zones 317 and 319 which are divided into feed sides and permeate sides by ion transport membranes 321 and 323. Preferably, ion transport membranes 321 and 323 are mixed conductor membranes as described above. Combustor 309 can be a direct combustor in which fuel 311 is combusted with oxygen-containing stream 307 to form combustion products which flow as streams 313 and 315 directly to membrane zones 317 and 319. Alternatively, combustor 309 can be an indirect system, i.e. a process furnace, in which stream 307 is indirectly heated by combustion of fuel 311 with outside air (not shown), whereby the heated streams 313 and 315 pass without composition change to membrane zones 317 and 319. Streams 313 and 315 are typically heated to 500°–1200° C. prior to membrane zones 317 and 319. High purity oxygen permeate 325 typically at greater than 98 vol % $O_2$ is withdrawn, cooled in exchanger 305 against compressed feed 304, and is compressed in product compressor 327 to yield oxygen product 329. High purity oxygen permeate 331 typically at greater than 98 vol % $O_2$ is withdrawn, cooled in exchanger 305 against compressed feed 304, and is withdrawn as atmospheric pressure oxygen product 333. Nonpermeate streams 335 and 337 are combined into stream 339 which is cooled against compressed feed 304 in exchanger 305 to yield oxygen-depleted waste stream 341. Optionally, combined nonpermeate stream 339 can be heated in combustor 343 prior to exchanger 305. Combustor 343 can be a direct combustor in which fuel 345 is combusted with oxygen-containing nonpermeate stream 339 to form combustion products which flow as stream 347 directly to exchanger 305. Alternatively, combustor 343 can be an indirect system, i.e. a process furnace, in which stream 339 is indirectly heated by combustion of fuel 345 with outside air (not shown), whereby the heated stream 347 passes without composition change to exchanger 305.

A key feature of this mode of the invention is that membrane zones 317 and 319 operate at different ratios of the feed side pressure to the permeate side pressure. The feed side pressures are essentially equivalent, which means that the pressures differ only by the minimal pressure drop through the related piping to the zones. The permeate side pressures are different, however, as permeate 325 is withdrawn at a higher pressure than stream 331 which is withdrawn as cooled product 333 at atmospheric pressure. Alternatively, stream 333 can by withdrawn at subatmospheric pressure be a vacuum blower (not shown) and discharged as a final product at atmospheric pressure.

Figure 4:
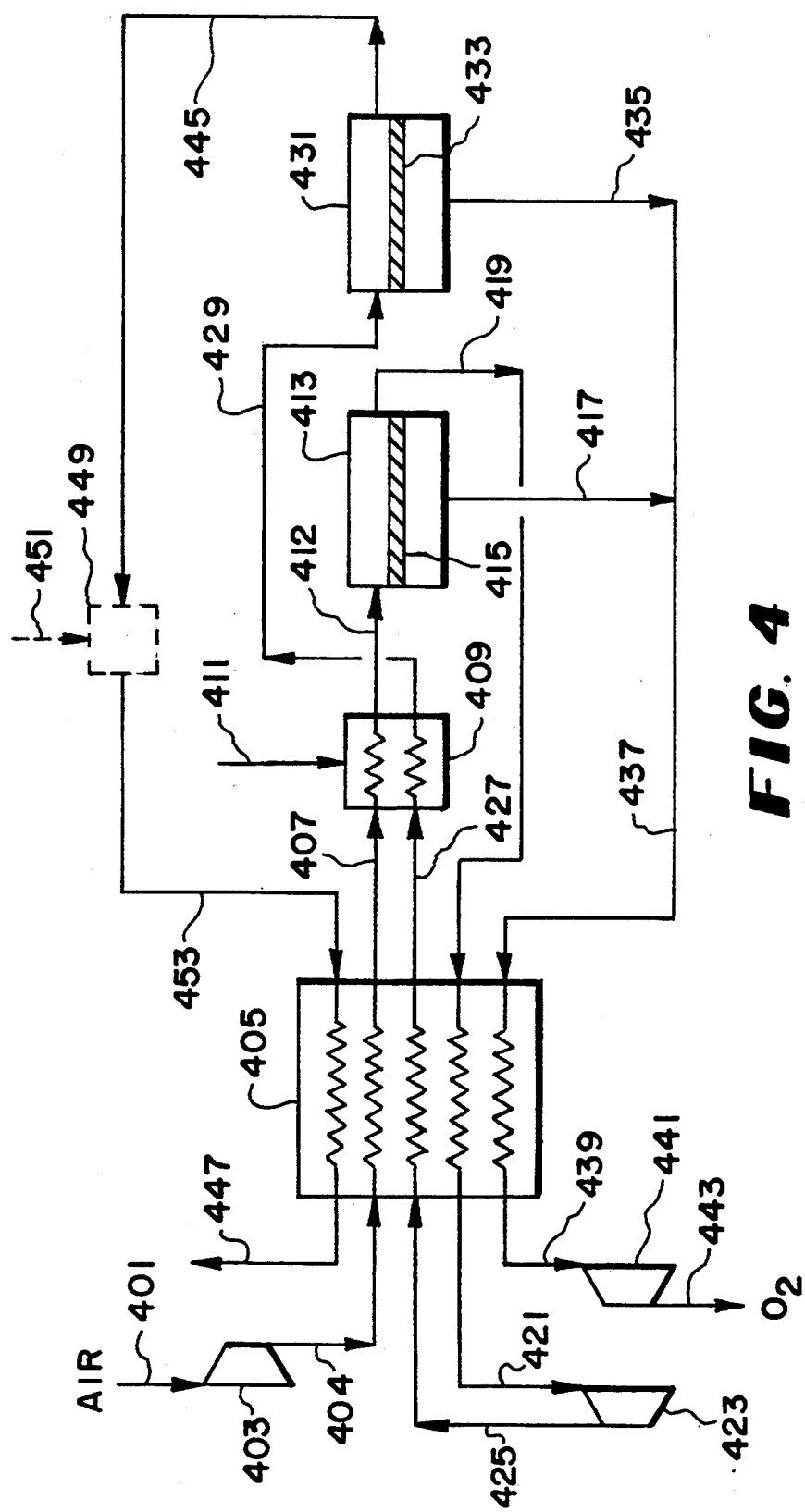
FIG. 4 is a schematic flowsheet of an alternative two-stage series ion transport membrane system for recovering high-purity oxygen according to the present invention.

An alternative embodiment of the series membranes of FIG. 2 is given in FIG. 4. In this alternative, the permeate sides of the membranes operate at essentially the same pressure, and the feed side pressures are different. Air or other oxygen-containing gas 401 is compressed to 15–500 psia in compressor 403 and heated in exchanger 405 by indirect heat exchange with hot gas streams defined later. Heated and compressed stream 407 is optionally further heated in combustor 409 and passed into the feed side of ion transport membrane zone 413 which is divided into a feed side and a permeate side by membrane 415. Combustor 409 is preferably an indirectly fired system, i.e. a process furnace, in which stream 407 is indirectly heated by combustion of fuel 411 with outside air (not shown), whereby the heated stream 412 passes without composition change to membrane zone 413. Stream 412 is typically heated to 500°–1200° C. prior to membrane zone 413. High purity oxygen permeate 417 at greater than 98 vol % $O_2$ is withdrawn from membrane zone 413.

Nonpermeate stream 419 is cooled in exchanger 405 against compressed feed 404, cooled stream 421 is compressed in compressor 423, and compressed stream 425 is heated against hot process streams in exchanger 405. Heated compressed stream 427 is optionally further heated in indirect combustor 409 and passes as stream 429 into the feed side of membrane zone 431 which is divided into a feed side and a permeate side by ion transport membrane 433. Preferably, ion transport membranes 415 and 433 are mixed conductor membranes as described above. High purity oxygen permeate 435 typically at greater than 98 vol % $O_2$ is withdrawn, combined with product stream 417, and combined stream 437 is cooled in exchanger 405 against compressed feed 404. Cooled product 439 optionally is compressed in compressor 441 to yield oxygen product 443. Nonpermeate stream 445 is cooled against compressed feed 404 in exchanger 405 to yield oxygen-depleted waste stream 447. Optionally, nonpermeate stream 445 can be heated in combustor 449 prior to exchanger 405. Combustor 449 can be a direct combustor in which fuel 451 is combusted with oxygen-containing nonpermeate stream 445 to form combustion products which flow as stream 453 directly to exchanger 405. Alternatively, combustor 449 can be an indirect system, i.e. a process furnace, in which stream 445 is indirectly heated by combustion of fuel 451 with outside air (not shown), whereby the heated stream 453 passes without composition change to exchanger 405.

In the embodiment of FIG. 4, membrane zones 413 and 431 operate at different ratios of the feed side pressure to the permeate side pressure, a key feature of the invention as discussed earlier. This is achieved by operation with essentially equal membrane zone permeate pressures and different feed pressures, in contrast with the embodiment of FIG. 2 in which the membrane zone feed pressures are essentially equal and the permeate pressures are different. In FIG. 4 the pressure ratio in the first stage is lower than in the second stage. Staged membrane operation thus enables a better distribution of the oxygen partial pressure driving force through the system, which leads to a thermodynamically more reversible process compared with the single-stage system of FIG. 1. The staged system of FIG. 4, as in the alternative embodiment of FIG. 2, operates with a lower power consumption compared with the single stage system for an equivalent final stage permeate pressure, final oxygen product pressure, and oxygen recovery.

Figure 5:
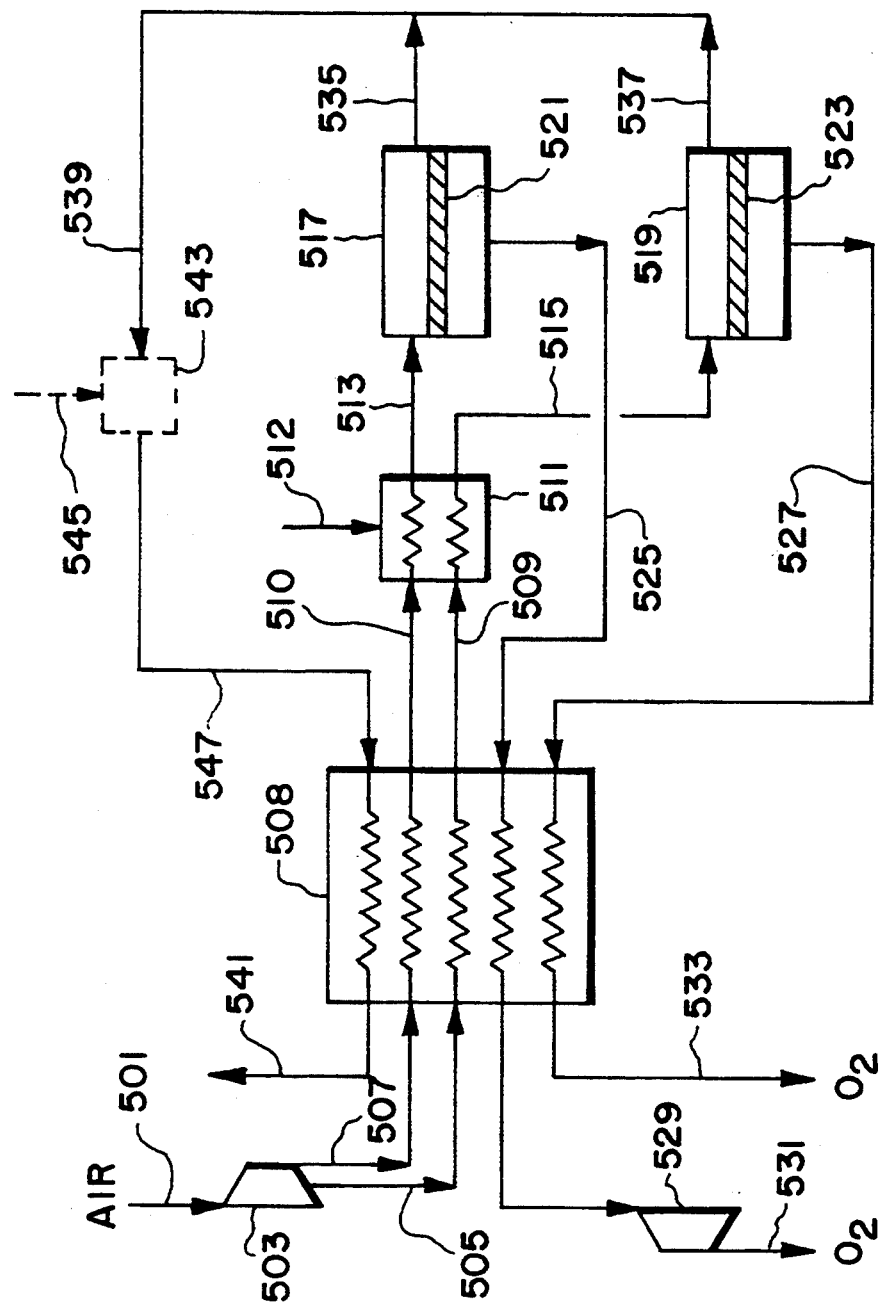
FIG. 5 is a schematic flowsheet of an alternative two-stage parallel ion transport membrane system for recovering high-purity oxygen according to the present invention.

A final embodiment of the invention which utilizes parallel membrane zones is illustrated in FIG. 5. Air or other oxygen-containing gas 501 is compressed in multistage compressor 503 to yield two compressed streams at different pressures, wherein stream 505 is withdrawn from an intermediate compressor stage at 15 to 350 psia and stream 507 is produced at the compressor discharge at 24 to 500 psia. The compressed streams are heated in exchanger 508 by indirect heat exchange with hot gas streams defined later. Heated and compressed streams 509 and 510 are optionally further heated in indirect combustor 511, and heated streams 513 and 515 are passed respectively into the feed sides of parallel ion transport membrane zones 517 and 519 which are divided into feed sides and permeate sides by ion transport membranes 521 and 523. Preferably, ion transport membranes 521 and 523 are mixed conductor membranes as described above. Combustor 511 is an indirect system, i.e. a process furnace, in which streams 509 and 510 are indirectly heated by combustion of fuel 512 with outside air (not shown), whereby the heated streams 513 and 515 pass without composition change to membrane zones 517 and 519 respectively. Streams 513 and 515 are typically heated to 500°–1200° C. prior to membrane zones 517 and 519. High purity oxygen permeate 525 typically at greater than 98 vol % $O_2$ is withdrawn from membrane zone 517, cooled in exchanger 508 against compressed feeds 505 and 507, and is compressed in product compressor 529 to yield oxygen product 531. High purity oxygen permeate 527 at greater than 98 vol % $O_2$ is withdrawn from membrane zone 519, cooled in exchanger 508 against compressed feeds 505 and 507, and is withdrawn as atmospheric pressure oxygen product 533. Nonpermeate streams 535 and 537 are combined into stream 539 which is cooled against compressed feeds 505 and 507 in exchanger 508 to yield oxygen-depleted waste stream 541. Optionally, combined nonpermeate stream 539 can be heated in combustor 543 prior to exchanger 508. Optionally, combustor 543 can heat stream 535 or 537 before these streams are combined into stream 539. Combustor 543 can be a direct combustor in which fuel 545 is combusted with oxygen-containing nonpermeate stream 539 to form combustion products which flow as stream 547 directly to exchanger 508. Alternatively, combustor 543 can be an indirect system, i.e. a process furnace, in which stream 539 is indirectly heated by combustion of fuel 545 with outside air (not shown), whereby the heated stream 547 passes without composition change to exchanger 508. This embodiment yields two separate oxygen product streams at different pressures. Alternatively, permeate streams 525 and 527 can be combined prior to exchanger 508 to yield a single product stream.

A key feature of this mode of the invention is that membrane zones 517 and 519 operate at different ratios of the feed side pressure to the permeate side pressure. The feed side pressures are different, while the permeate side pressures are either equal or different depending upon the desired products. Preferably, the two oxygen products 531 and 533 are provided at different pressures.

In each of the embodiments of the invention, a presurized oxygen-containing nonpermeate stream is produced (e.g. streams 237 of FIG. 2, 341 of FIG. 3, 447 of FIG. 4, and 541 of FIG. 5). Power can be recovered from any of these streams directly by means of an expansion turbine, or any of the streams can be combusted in a gas turbine combustor and the hot combustion gas expanded to generate power.

The ion transport membranes utilized in the embodiments described above are typically solid ceramic assemblies in the form of tubes, sheets, or monolithic honeycomb. Any solid ceramic membrane material which selectively permeates oxygen can be utilized in the present invention. The active ceramic material preferably is selected from materials of the mixed conductor type as described in U.S. Pat. No. 5,240,480, which is incorporated herein by reference. This patent discloses a membrane which comprises a porous layer with an average pore radius of less than 10 microns upon which is deposited a nonporous dense layer, in which both the porous substrate and the nonporous dense layer comprise multicomponent metallic oxides capable of conducting electrons and oxygen ions. This composite membrane operates at temperatures above 500° C. and recovers high purity oxygen by the mechanism discussed earlier. Representative membranes are described in U.S. Pat. No. 5,240,480 in which the porous layer and/or the dense layer are formed from a multicomponent metallic oxide selected from the group consisting of $La_{0.2}Ba_{0.8}Co_{0.8}Fe_{0.2}O_{3-x}$, $Pr_{0.2}Ba_{0.8}Co_{0.8}Fe_{0.2}O_{3-x}$, and $La_{0.2}Ba_{0.8}Co_{0.6}Cu_{0.2}Fe_{0.2}O_{3-x}$ where x is between 0 and 1.

Ion transport membranes of the electrically-driven solid electrolyte type optionally may be employed in the membrane separation zones. Preferred membranes of the solid electrolyte type can be fabricated by depositing a thin layer of multicomponent oxide on a porous substrate as described in U.S. Pat. No. 5,160,618, which is incorporated herein by reference. A preferred membrane comprises yttria-stabilized zirconia which has been deposited into the micropores of a lanthanum-doped alumina surface layer of a porous alumina substrate having an average pore diameter of less than about 50 nanometers and on the surface layer of the alumina substrate wherein the thickness of the yttria-stabilized zirconia is 0.5 microns or less. The yttria-stabilized zirconia layer is deposited at a temperature of 700°-1100° C. at a pressure of 1 to 760 torr over a time period ranging from 1 to 120 minutes by the following method. At least two metal halides, for example yttrium chloride and zirconium chloride, are vaporized on one side of the substrate described above and an oxidizing gas such as a mixture of oxygen and water is contacted with the other side of the substrate. The two gas mixtures diffuse and react within the pores of the porous surface layer to deposit the corresponding metal oxides therein, forming the membrane capable of separating an oxygen-containing gas mixture by the mechanism described earlier. This thin coating of active membrane material can be deposited on tubes, sheets, or monolithic honeycomb before or after assembly in a membrane module.

EXAMPLE 1

The single stage and two stage mixed conductor membrane systems of FIGS. 1 and 2 were simulated by means of heat and material balances, and the specific power requirements for the feed compressor and vacuum blower were calculated. The same simulation was also carried out for a three stage system (not shown) in which a third stage in series is added to the system of FIG. 2, and a three-stage vacuum blower is used. In all cases the systems operate with the following common parameters: membrane temperature, 850° C.; oxygen production rate, 20 tons/day; oxygen recovery from feed, 11.6%; compressor discharge pressure, 29.7 psia; membrane zone feed side pressure, 24.7 psia (pressure drop through the membrane zones was assumed negligible); unmixed flow in the feed side; permeate withdrawal by vacuum blower delivering oxygen product at 14.7 psia; air pressure drop through main exchangers 105 and 205, 5 psi; and oxygen pressure drop through main exchangers 105 and 205, 75 torr (1.45 psi). The adiabatic efficiencies of the feed air compressor and the vacuum blower are 78% and 57% respectively. The feed and permeate oxygen partial pressures for the one, two, and three stage cases are summarized in Table 1.

TABLE 1

| Feed and Permeate Oxygen Partial Pressures for Example 1 (torr) | | | |
|---|---|---|---|
| | Stage 1 | Stage 2 | Stage 3 |
| Single Stage System: | | | |
| feed in | 268 | — | — |
| nonpermeate out | 135 | — | — |
| permeate | 120 | — | — |
| Two Stage System: | | | |
| feed in | 268 | 200 | — |
| nonpermeate out | 200 | 135 | — |
| permeate | 180 | 120 | — |
| Three Stage System: | | | |
| feed in | 268 | 220 | 180 |
| nonpermeate out | 220 | 180 | 135 |
| permeate | 200 | 160 | 120 |

In these three cases, the final stage Oxygen permeate is withdrawn at 120 torr. For the multiple stage systems, it is seen that stage 1 permeate is withdrawn at a progressively higher pressure as the number of stages increases. The multiple stage systems operate at successively increasing ratios of the feed side to the permeate side oxygen partial pressure.

The calculated specific power and relative power for the three cases are summarized in Table 2. The calculated specific power is the total for the air feed compressor and the oxygen vacuum blower.

TABLE 2

Comparison of Specific Power for Cases of Example 1

| Total Stages | kW hr/ton $O_2$ | Relative Power |
|---|---|---|
| One | 330 | 1.0 |
| Two | 312 | 0.95 |
| Three | 307 | 0.93 |

The utilization of stages yields a better distribution of the overall oxygen partial pressure driving force through the system, which leads to a thermodynamically more reversible process compared with the single stage system. As seen in Table 2, this results in a decrease in the specific power as the number of stages increases; the two stage system operates with a lower power consumption than the single stage system, and the three stage system operates with a lower power consumption than the one and two stage systems.

EXAMPLE 2

The single stage and two stage mixed conductor membrane systems of FIGS. 1 and 2 were simulated by means of heat and material balances in a manner similar to that of Example 1. In Example 2, the single stage process of FIG. 1 and the two stage process of FIG. 2 are used to produce two different oxygen product streams of equal flow rates at 150 and 14.7 psia respectively. In the process of FIG. 1, cooled oxygen product 119 is withdrawn at atmospheric pressure, one half is taken as a first product, and the other half is compressed to 150 psia by compressor 121 as a second product. In the process of FIG. 2, cooled oxygen product 233 is withdrawn at atmospheric pressure; vacuum blower 221 is not used. Cooled oxygen product 219 is compressed to 150 psia (not shown). The two systems operate with the following common parameters: membrane temperature, 850° C.; total oxygen production rate, 20 tons/day; oxygen recovery from feed, 11.6%; feed compressor discharge pressure, 179.7 psia; membrane zone feed side pressure, 174.7 psia (pressure drop through the membrane zones was assumed negligible); air pressure drop through main exchangers 105 and 205, 5 psi; and oxygen pressure drop through main exchangers 105 and 205, 1.9 psi. No credit is taken for power recovery from pressurized nonpermeate streams 133 or 237. The adiabatic efficiency for oxygen product compression in both systems is 78%. The feed and permeate oxygen partial pressures for the one and two stage cases are summarized in Table 3.

TABLE 3

Feed and Permeate Oxygen Partial Pressures for Example 2 (torr)

|  | Stage 1 | Stage 2 |
|---|---|---|
| Single Stage System: |  |  |
| feed | 1897 | — |
| nonpermeate | 964 | — |
| permeate | 860 | — |
| Two Stage System: |  |  |
| feed | 1897 | 1430 |
| nonpermeate | 1430 | 964 |
| permeate | 1367 | 860 |

The specific power and relative specific power for oxygen product compression were calculated and are given in Table 4.

TABLE 4

Comparison of Specific Power for Cases of Example 2

| Total Stages | Product Compression Power, kW hr/ton | Relative Power |
|---|---|---|
| One | 36.9 | 1.0 |
| Two | 26.7 | 0.73 |

It is seen that staging of the membrane system results in a significant decrease in the compression power required to produce two product streams at different pressures. The utilization of a different pressure ratio in each stage of the two stage system yields a better distribution of the overall oxygen partial pressure driving force through the system, which leads to a thermodynamically more reversible process compared with the single stage system. As seen in Table 4, this results in a decrease in the specific product compression power as the number of stages increases; the two stage system operates with a lower power consumption than the single stage system. The two stage system is especially adapted to the efficient production of two oxygen product streams at different pressures.

The staged operation of high temperature mixed conductor membranes thus offers significant power reduction compared with the operation of a single stage system at comparable process conditions. The staging of mixed conductor membrane systems is fundamentally different from staged systems which use polymeric or porous diffusion membranes because the permeate from each stage of a mixed conductor membrane system is essentially a pure component while the permeate streams from stages of these other membrane systems are mixtures enriched in certain components relative to the membrane feed. Staging in these other membrane systems is used exclusively to increase product purity and recovery; conversely, staging in ion transport membrane systems has no effect on product purity and therefore would not be used to increase product purity. The reduction in power requirements by staging in the present invention is therefore unexpected in view of the teachings in the art regarding these other types of staged membrane systems.

The essential characteristics of the present invention are described completely in the foregoing disclosure. One skilled in the art can understand the invention and make various modifications thereto without departing from the basic spirit thereof, and without departing from the scope of the claims which follow.

We claim:

1. A process for recovering oxygen from an oxygen-containing gas mixture comprising the steps of:
    (a) compressing said oxygen-containing gas mixture;
    (b) heating the resulting compressed gas mixture of step (a);
    (c) passing the resulting compressed and heated mixture of step (b) into a first membrane separation zone comprising an oxygen-selective ion transport membrane which separates said zone into a feed side and a permeate side, and withdrawing from said zone a first high-purity oxygen permeate stream and a first oxygen-containing non-permeate stream; and
    (d) passing said first oxygen-containing non-permeate stream into a second membrane separation zone comprising an oxygen-selective ion transport membrane which separates said zone into a feed side and a permeate side, and withdrawing from said zone a second high-purity oxygen permeate stream and a second oxygen-containing non-permeate stream; wherein each of said membrane separation zones operates at a different ratio of feed side pressure to permeate side pressure.

2. The process of claim 1 wherein said ion transport membranes are mixed conductor membranes.

3. The process of claim 2 wherein the temperature in each of said membrane separation zones is between 500° and 1200° C.

4. The process of claim 2 wherein said membrane separation zones operate at essentially equivalent feed side pressures and different permeate side pressures.

5. The process of claim 4 wherein said heating of the resulting compressed gas mixture of step (a) is accomplished at least in part by indirect heat exchange with said first and second high-purity oxygen permeate streams.

6. The process of claim 4 wherein said heating of the resulting compressed gas mixture of step (a) is accomplished at least in part by indirect heat exchange with said second oxygen-containing non-permeate stream.

7. The process of claim 6 which further comprises heating said second oxygen-containing non-permeate stream in a direct or indirect combustor prior to said indirect heat exchange with the compressed gas mixture of step (a).

8. The process of claim 4 wherein said heating of the resulting compressed gas mixture of step (a) is accomplished at least in part by passing said compressed gas mixture through a direct or indirect combustor prior to said first membrane separation zone.

9. The process of claim 2 wherein said membrane separation zones operate at essentially equivalent permeate side pressures and different feed side pressures.

10. The process of claim 9 which further comprises cooling said first oxygen-containing non-permeate stream, compressing the resulting cooled stream, and heating the resulting compressed stream prior to step (d).

11. The process of 10 wherein said heating of the resulting compressed stream is accomplished at least in part by passing said stream through an indirect combustor.

12. The process of claim 9 wherein said heating of the resulting compressed gas mixture of step (a) is accomplished at least in part by indirect heat exchange with said first and second high-purity oxygen permeate streams.

13. The process of claim 9 wherein said heating of the resulting compressed gas mixture of step (a) is accomplished at least in part by indirect heat exchange with said second oxygen-containing non-permeate stream.

14. The process of claim 13 which further comprises heating said second oxygen-containing non-permeate stream in a direct or indirect combustor prior to said indirect heat exchange with the compressed gas mixture of step (a).

15. The process of claim 9 wherein said heating of the resulting compressed gas mixture of step (a) is accomplished at least in part by passing said compressed gas mixture through an indirect combustor prior to said first membrane separation zone.

16. The process of claim 1 wherein said oxygen-containing gas mixture is air.

17. The process of claim 1 wherein said first and second high-purity oxygen permeate streams contain at least 98 vol % oxygen.

18. A process for recovering oxygen from an oxygen-containing gas mixture comprising the steps of:
(a) compressing said oxygen-containing gas mixture;
(b) heating the resulting compressed gas mixture of step (a);
(c) passing a portion of the resulting compressed and heated mixture of step (b) into a first membrane separation zone comprising an oxygen-selective ion transport membrane which separates said zone into a feed side and a permeate side, and withdrawing from said zone a first high-purity oxygen permeate stream and a first oxygen-containing non-permeate stream; and
(d) passing another portion of the resulting compressed and heated mixture of step (b) into a second membrane separation zone comprising an oxygen-selective ion transport membrane which separates said zone into a feed side and a permeate side, and withdrawing from said zone a second high-purity oxygen permeate stream and a second oxygen-containing non-permeate stream;
wherein each of said membrane separation zones operates at a different ratio of the feed side pressure to the permeate side pressure.

19. The process of claim 18 wherein said ion transport membranes are mixed conductor membranes.

20. The process of claim 19 wherein said membrane separation zones operate at essentially equivalent feed side pressures and different permeate side pressures.

21. The process of claim 20 wherein said heating of the resulting compressed gas mixture of step (a) is accomplished at least in part by indirect heat exchange with said first and second high-purity oxygen permeate streams.

22. The process of claim 20 wherein said heating of the resulting compressed gas mixture of step (a) is accomplished at least in part by indirect heat exchange with one or a combination of said first and second oxygen-containing non-permeate streams.

23. The process of claim 20 which further comprises combining said first and second oxygen-containing non-permeate streams, heating the resulting combined stream in a direct or indirect combustor, and further heating the combined stream by indirect heat exchange with the compressed gas mixture of step (a).

24. The process of claim 20 wherein said heating of the resulting compressed gas mixture of step (a) is accomplished at least in part by passing said compressed gas mixture through a direct or indirect combustor prior to said first and second membrane separation zones.

25. The process of claim 18 wherein said oxygen-containing gas mixture is air.

26. The process of claim 18 wherein said first and second high-purity oxygen permeate streams contain at least 98 vol % oxygen.

27. The process of claim 18 wherein the temperature in each of said membrane separation zones is between 500° and 1200° C.

28. A process for recovering oxygen from an oxygen-containing gas mixture comprising the steps of:
(a) compressing said oxygen-containing gas mixture to obtain a first compressed gas stream at a first pressure and a second compressed gas stream at a second pressure;

(b) heating the resulting compressed gas streams of step (a);

(c) passing the resulting first compressed and heated gas stream of step (b) into a first membrane separation zone comprising an oxygen-selective ion transport membrane which separates said zone into a feed side and a permeate side, and withdrawing from said zone a first high-purity oxygen permeate stream and a first oxygen-containing non-permeate stream; and (d) passing the resulting second compressed and heated gas stream of step (b) into a second membrane separation zone comprising an oxygen-selective ion transport membrane which separates said zone into a feed side and a permeate side, and withdrawing from said zone a second high-purity oxygen permeate stream and a second oxygen-containing non-permeate stream;

wherein each of said membrane separation zones operates at a different ratio of the feed side pressure to the permeate side pressure.

29. The process of claim 28 wherein said ion transport membranes are mixed conductor membranes.

30. The process of claim 28 wherein said oxygen-containing gas mixture is air.

31. The process of claim 28 wherein said first and second high-purity oxygen permeate streams contain at least 98 vol % oxygen.

* * * * *